(12) United States Patent
Ishida et al.

(10) Patent No.: US 6,369,854 B2
(45) Date of Patent: *Apr. 9, 2002

(54) DISTANCE DETECTING DEVICE FOR AN OPTICAL SYSTEM

(75) Inventors: Iwao Ishida, Higashiosaka; Akio Kinba, Suita, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,427

(22) Filed: Mar. 27, 1997

(51) Int. Cl.$^7$ ................................................ H04N 5/232
(52) U.S. Cl. ...................... 348/345; 335/340; 335/350
(58) Field of Search .......................... 348/335, 340, 348/345, 349, 350, 357; 369/111, 114; 250/201.2, 201.7, 201.8

(56) References Cited

U.S. PATENT DOCUMENTS 4,592,637 A * 6/1986 Suda ........................... 396/111
4,652,931 A * 3/1987 Okudaira et al. ............ 348/350
5,477,303 A * 12/1995 Goto ............................ 396/114
5,530,236 A * 6/1996 Sensui ......................... 396/111
5,642,223 A * 6/1997 Hasushita et al. ........... 359/557
5,646,393 A * 7/1997 Sensui ....................... 250/201.8

FOREIGN PATENT DOCUMENTS

JP            62-183416        8/1987

* cited by examiner

Primary Examiner—Wendy P. Garber
Assistant Examiner—Mitchell White
(74) Attorney, Agent, or Firm—McDermott, Will & Emery

(57) ABSTRACT

The AF sensor module primarily comprises condenser lens 16, mirror 17, aperture mask 18, separator lens 19 and CCD 20. Separator lens 19 is located such that its lengthwise center line M may be parallel to the lengthwise center line N of CCD 20 while it is inclined by micro-angle δ with center line M as the rotational axis. By arranging the lens surface of separator lens 19 and the image pickup surface of CCD 20 such that they are non-parallel to each other, reflected light L1 existing due to the reflection of light between separator lens 19 and CCD 20 is prevented from striking CCD 20 once again so that a reduction in the accuracy of focus detection caused by said reflected light may be prevented.

9 Claims, 7 Drawing Sheets

DISTANCE DETECTING DEVICE FOR AN OPTICAL SYSTEM

BACKGROUND OF THE INVENTION

1. Field of the Invention

The present invention pertains to a detecting device that detects information regarding the distance to a target object, e.g., a focus detecting device or distance detecting device employed in a camera.

2. Description of the Related Art

FIG. 7 is a perspective view showing the basic construction of a conventional AF sensor module (focus detecting device) using the phase difference detection method.

The AF sensor module is equipped with condenser lens 101, module mirror 102, aperture mask 103, separator lens 104 and CCD line sensor 105. Condenser lens 101, if used in a single lens reflex camera for example, converges an object photo image that is formed on a film equivalent surface by a photo-taking lens. Module mirror 102 is a reflecting mirror that leads the light that passes through condenser lens 101 to CCD line sensor 105. Aperture mask 103 limits the field of view of plano-convex lenses 104A and 104B of separator lens 104.

Separator lens 104 comprises a pair of small plano-convex lenses 104A and 104B that are molded as one unit, and separates the object photo image into two photo images so that each of the photo images may be re formed at prescribed forming positions on CCD line sensor 105 (a standard area and a reference area). Aperture mask 103 (not completely shown in the drawing) that adjusts the amount of incident light is attached to separator lens 104 on the surface that the light strikes. The optical axes of plano-convex lenses 104A and 104B are decentered relative to each other so that the separated photo images will be formed at their respective image forming positions, e.g., standard area 105A and reference area 105B of CCD line sensor 105.

CCD line sensor 105 is a sensor that has multiple photoelectric conversion elements arranged in a line, and has image forming positions, i.e., standard area 105A and reference area 105B, that are located on either side of and at a prescribed distance from lengthwise center position O.

Separator lens 104 and CCD line sensor 105 are located such that direction A of the lens surface and direction B of the image pickup surface are perpendicular to optical axis L of the object photo image that is led via module mirror 102.

The object photo image led by module mirror 102 is separated into two photo images by means of plano-convex lenses 104A and 104B of separator lens 104. The photo images are then formed on standard area 105A and reference area 105B of CCD line sensor 105 and taken in by standard area 105A and reference area 105B, respectively. Subsequently, based on the difference in image forming position between the image on standard area 105A and the image on reference area 105B (the phase difference), the focus position regarding the photo object is detected by a processor not shown in the drawing.

In addition, a focus detecting device equipped with a filter that eliminates light in the infrared wavelength range has also been proposed (Japanese Laid-Open Patent Application Sho 62-183416), in which the filter surface and the image pickup surface of the image pickup device are arranged such that they are not optically parallel to each other and detection errors due to reflected light existing in the device are reduced.

Because the conventional AF sensor module described above has the lens surface of separator lens 104 and the image pickup surface of CCD line sensor 105 arranged parallel to each other, the light reflected on the image pickup surface of CCD line sensor 105 is reflected again by the convex lens surfaces of separator lens 104 toward CCD line sensor 105, as shown in FIG. 7, for example. Consequently, the reflected light and stray light from said reflection strike the image pickup surface of CCD line sensor 105, and false image signals caused by incident light other than direct light are output.

FIG. 8 is a waveform chart regarding the output signals from CCD line sensor 105 that shows how said signals are output. In this drawing, the positive x-axis side shows the waveform of the output signals from standard area 105A and the negative x-axis side shows the waveform of the output signals from reference area 105B. Signals S1 and S1' at positions x1 and −x1 are image signals via direct light led via module mirror 102. Signals S2 and S2' at positions x2 and −x2 are false image signals caused by reflected light existing between separator lens 104 and CCD line sensor 105.

As shown in the drawing, because false image signals S2 and S2' are output from standard area 105A and reference area 105B, when the phase difference is to be detected by comparing the image on standard area 105A with the image on reference area 105B, said false image signals S2 and S2' adversely affect the detection and cause an error in the detection result.

On the other hand, in the device disclosed in Japanese Laid-Open Patent Application Sho 62-183416, the infrared light eliminating filter is inclined with regard to the image pickup device so that false image signals caused by light reflected from this filter may be removed. However, in standard AF sensor modules that do not have such an optical filter, it is difficult to effectively eliminate false image signals caused by the light reflected from separator lens 104 as described above.

SUMMARY OF THE INVENTION

The present invention was made in view of the problem described above. Its object is to provide a detecting device that reduces detection errors caused by signals generated by received light other than direct light, such as reflected flight and stray light existing in the detecting device, and that is capable of performing highly accurate detection.

Another object of the present invention is to provide, using a simple construction, a detecting device that can prevent light flux other than direct light, such as reflected light and stray light existing in the detecting device, from striking the light-receiving element.

In order to attain said objects, the detecting device of the present invention has an image pickup device including plural photoelectric conversion elements arranged in a line; and an image re-forming lens that re-forms an image of an object formed by a prescribed optical system on an image pickup surface of said image pickup device; wherein a lens surface of said image re-forming lens and said image pickup surface of said image pickup device are arranged such that they are non-parallel to each other.

Using the construction described above, the photo image of the target object that is formed by means of the prescribed optical system is re-formed on the image pickup device. When this happens, even if part of the light flux that pass through the image re-forming lens and strike the image pickup surface of the image pickup device are reflected toward the image re-forming lens and are reflected again by the lens surface of the image re-forming lens toward the image pickup means, the non-parallel arrangement of the lens surface of the image re-forming lens and the image pickup surface of the image pickup device causes the reflected light from the image re-forming lens to veer away from the image pickup surface of the image pickup device. Consequently, said reflected light does not strike the image pickup device again and false image signals caused by the reflected light are not included in the image pickup signals. Therefore, using a simple construction in which the lens surface of the image re-forming lens and the image pickup surface of the image pickup device are arranged to be non-parallel to each other, detection errors caused by stray light, etc. are reduced and the accuracy in detection improves.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1:
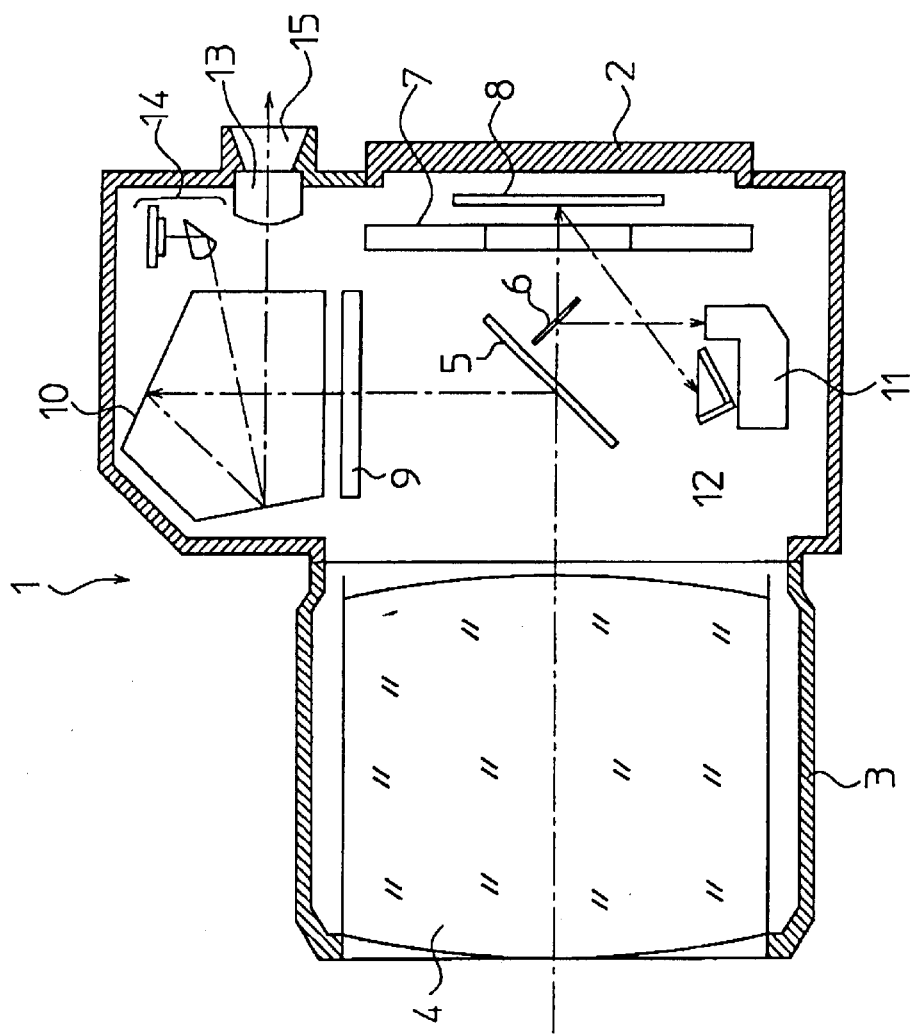
FIG. 1 is a drawing showing the outline construction of a camera in which the focus detecting device, an embodiment of the detecting device pertaining to the present invention, is employed.

FIG. 1 shows the outline construction of a camera in which the focus detecting device, an embodiment of the detecting device pertaining to the present invention, is employed.

Camera 1 comprises camera main body 2 and interchangeable lens system 3. Main mirror 5, sub-mirror 6, shutter 7, and film surface 8 are located in that order at prescribed intervals behind photo-taking lens unit 4 of interchangeable lens system 3 inside camera main body 2. Condenser lens 9 and pentagonal roof prism 10 are located above main mirror 5 inside camera main body 2, and AF sensor module 11 and TTL light adjustment sensor 12 are located below main mirror 5. Further, finder optical system 13 is located in the rear upper area of camera main body 2 and faces pentagonal roof prism 10, and AE sensor 14 is located above finder optical system 13.

Photo-taking lens unit 4 forms the object photo image onto film surface 8. Main mirror 5 comprises a half-mirror. It leads part of the light flux toward AF sensor module 11 via sub-mirror 6 and reflects the rest of the light flux toward condenser lens 9 and pentagonal roof prism 10. Sub-mirror 6 reflects part of the light flux that pass through main mirror 5 downward toward AF sensor module 11.

Shutter 7 is an exposure control member that controls the degree of exposure of film surface 8 and comprises a focal plane shutter, for example. Condenser lens 9 converges the reflected light from main mirror 5 and leads it to pentagonal roof prism 10. Pentagonal roof prism 10 leads the light flux led by main mirror 5 to finder optical system 13. Finder optical system 13 outputs the object photo image, which is led by pentagonal roof prism 10, to finder window 15 such that the user may recognize the object photo image through this finder window 15.

AE sensor 14 comprises a light receiving element such as an SPC, as well as an optical lens that leads the light flux that pass through pentagonal roof prism 10 to said light receiving element. It measures the brightness of the object. AF sensor module 11 detects the state of focusing of the photo-taking lens unit with regard to the photo object using the object photo image that is led via sub-mirror 6, and comprises a focus detecting device. The construction of AF sensor module 11 is described below.

TTL light adjustment sensor 12 detects the amount of light emitted during photo-taking using a flash (hereinafter 'flash photo-taking'). In flash photo-taking, TTL light adjustment sensor 12 receives the light reflected from film surface 8 and detects the appropriate flash light amount based on the amount of light thus received (the amount of flash light that reaches film surface 8 after being reflected by the photo object).

Figure 2:
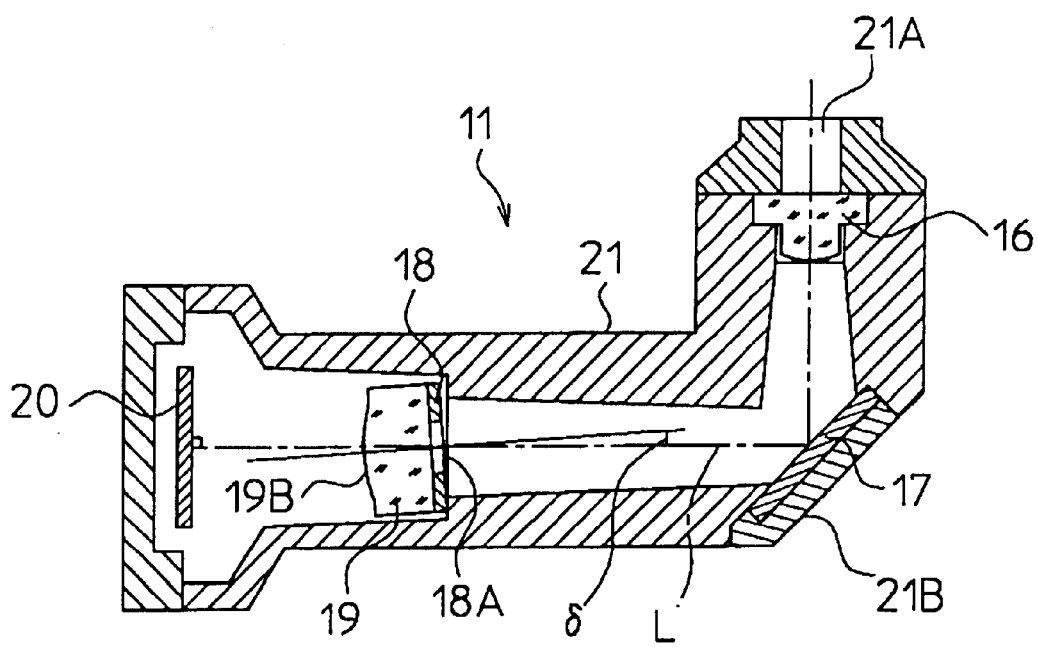
FIG. 2 is a vertical cross-sectional view showing the construction of a first embodiment of the focus detecting device.
Figure 3:
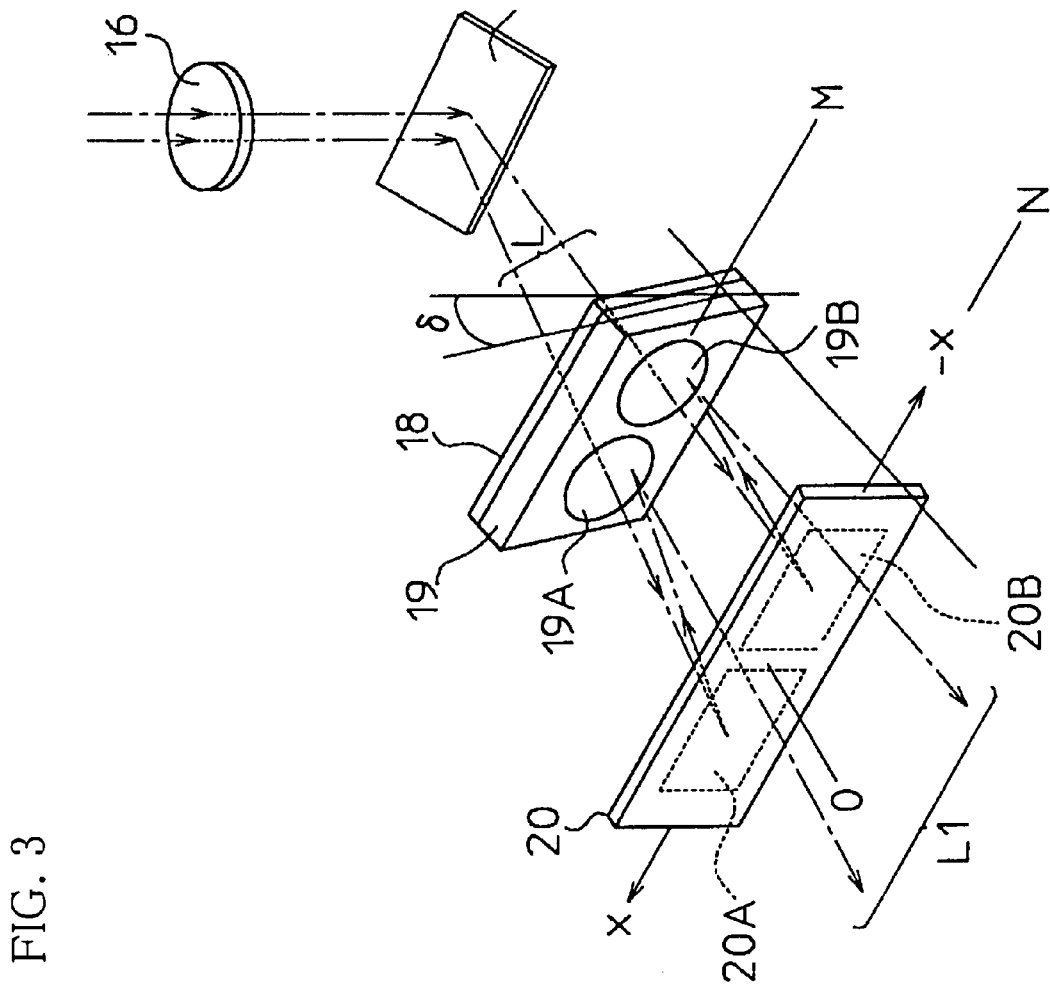
FIG. 3 is a perspective view showing the optical system of the focus detecting device.
Figure 4:
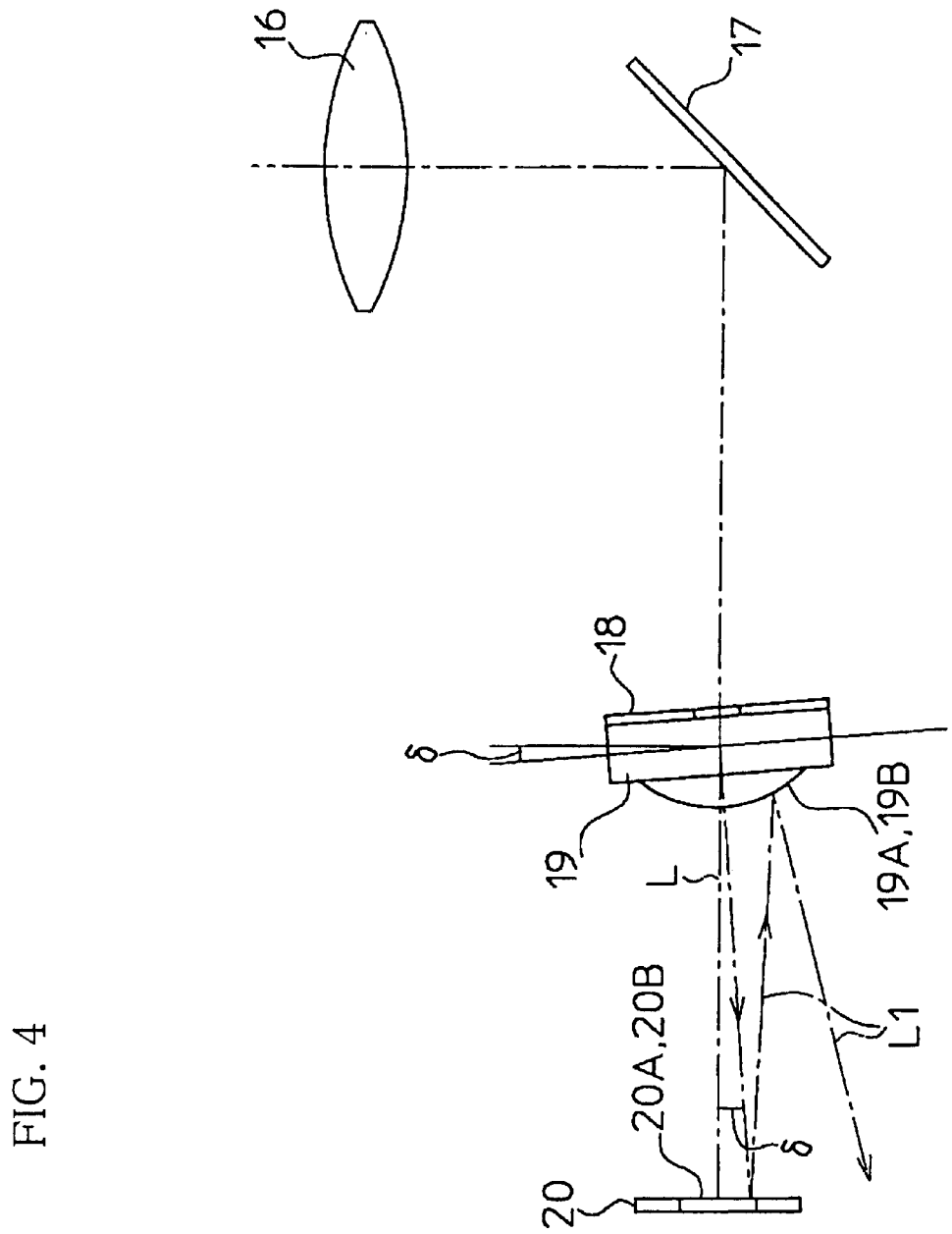
FIG. 4 is a drawing showing the optical path of the light flux inside the focus detecting device.

FIG. 2 is a vertical cross-sectional view showing the construction of a first embodiment of AF sensor module 11. FIG. 3 is a perspective view showing the optical system of AF sensor module 11.

AF sensor module 11 primarily comprises condenser lens 16, total reflecting mirror 17, aperture mask 18, separator lens 19, image pickup device 20 and L-shaped cylindrical housing 21. Housing 21 is a member that creates an L-shaped light path as well as supports said various other members. Housing 21 has light inlet 21A at the end of the arm whose length from its end to corner 21B is shorter than that of the other arm.

Condenser lens 16 converges the light led by sub-mirror 6 and is located at light inlet 21A of housing 21. Image pickup device 20 converts the object photo image led via sub-mirror 6 into electric signals in order to input them, and comprises a CCD line sensor which has a plural photoelectric conversion elements arranged in a line. Image pickup device 20 (hereinafter 'CCD 20') is located at the end of the arm whose length from its end to corner 21B of housing 21 is longer than the other arm.

CCD 20 has a pair of image pickup areas 20A and 20B that are located on either side of and at a prescribed distance from center O along the length of CCD 20, as shown in FIG. 3. Image pickup area 20A which is located on the right hand side in terms of the direction in which the light flux travel is an image pickup area that functions as a standard when the images input through image pickup areas 20A and 20B are compared with each other (hereinafter 'the standard area'), while image pickup area 20B which is located on the left hand side is an image pickup area that works as a reference in said comparison (hereinafter 'the reference area').

Mirror 17 bends the light flux led by condenser lens 16 and leads them to CCD 20. It is located at corner 21B of housing 21.

Separator lens 19 separates the object photo image that is led via mirror 17 into two photo images aligned in the direction parallel to the length of CCD 20 (hereinafter 'the lateral direction'), as shown in FIG. 3, and re-forms each of said photo images on standard area 20A and reference area 20B of CCD 20, respectively. Separator lens 19 comprises two small plano-convex lenses 19A and 19B, which have a flat surface on the side struck by the light flux (hereinafter 'the struck surface') and a convex spherical surface on the side from which the light flux exit. It is constructed using a plastic lens material molded into a wide rectangular parallelepiped with a pair of small spherical surfaces located at one side along its length.

Separator lens 19 is inclined with lengthwise center line M as the rotational axis by prescribed micro-angle δ such that its upper edge approaches CCD 20. In other words, separator lens 19 is located such that its lens surface is inclined relative to optical axis L within a plane perpendicular to center line N of the image pickup surface of CCD 20 which incorporates optical axis L (a plane parallel to the paper surface in FIG. 2, hereinafter 'the vertical plane'). It is also acceptable if the angling is such that the lower edge of separator lens 19 approaches CCD 20.

Because center line M of separator lens 19 and lengthwise center line N of CCD 20 are parallel to each other, separator lens 19 and CCD 20 has a positional relationship in which the lens surface and the image pickup surface are non-parallel to each other within the vertical plane.

The lens surface of separator lens 19 is inclined relative to the image pickup surface of CCD 20 in this way such that they are not parallel to each other in order to prevent stray light L1 or reflected light L1 that arise due to the reflection of light off separator lens 19 and CCD 20 from striking the image pickup surface of CCD and adversely affecting the image signals output from CCD 20. Therefore, micro-angle δ by which to angle separator lens 19 is set at an appropriate angle (e.g, two to three degrees) that can prevent said adverse effect.

Aperture mask 18 limits the field of view of plano-convex lenses 19A and 19B of separator lens 19. Aperture mask 18 has a configuration that is essentially the same as the struck surface of separator lens 19. It comprises. a light blocking member having opening 18A of a prescribed size (see FIG. 2) at a position facing plano-convex lenses 19A and 19B, and is located on the struck surface of separator lens 19 as if they formed a single unit.

By means of the construction described above, in housing 21, the light flux that strike the center of separator lens 19 via condenser lens 16, mirror 17 and aperture mask 18 pass through separator lens 19 while being inclined downward relative to optical axis L by micro-angle δ, and strike positions slightly lower than the lengthwise center line of the image pickup surface of CCD 20. In other words, the photo images of the photo object are formed at positions on standard area 20A and reference area 20B of CCD 20, said positions being lower than the center positions of said areas.

On the other hand, part of the light flux L1 that strike CCD 20 are reflected by the image pickup surface toward separator lens 19, but since separator lens 19 is located such that its optical axis is inclined downward, the light path of light flux L1 that are reflected again by the exit surface of separator lens 19 toward CCD 20 runs below the image pickup surface of CCD 20 and therefore said light flux L1 do not strike CCD 20.

Figure 5:
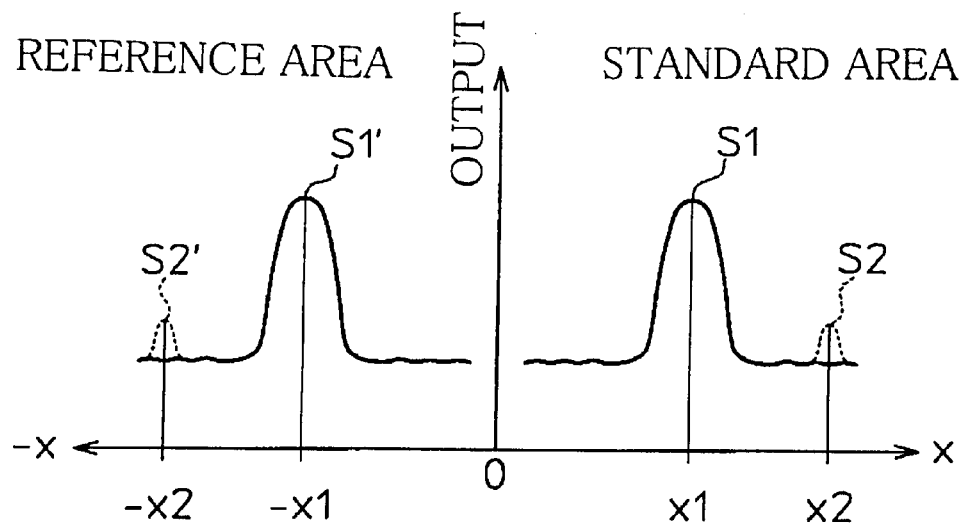
FIG. 5 is a waveform chart showing one example of image signals output from the standard area and the reference area of the CCD.

Consequently, only image signals S1 and S1' based on the true formed photo images of the photo object are output from standard area 20A and reference area 20B of CCD 20, as shown in FIG. 5 for example, and false image signals S2 and S2' caused by light flux L1 such as reflected light existing due to the reflection of light between separator lens 19 and CCD 20 (see the dotted line waveforms in FIG. 5) are not output.

Therefore, errors caused by said false image signals S2 and S2' in the detection of the focus position that are detected based on the phase difference between image signal S1 output from standard area 20A of CCD 20 and image signal S1' output from reference area 20B may be reduced.

Figure 6:
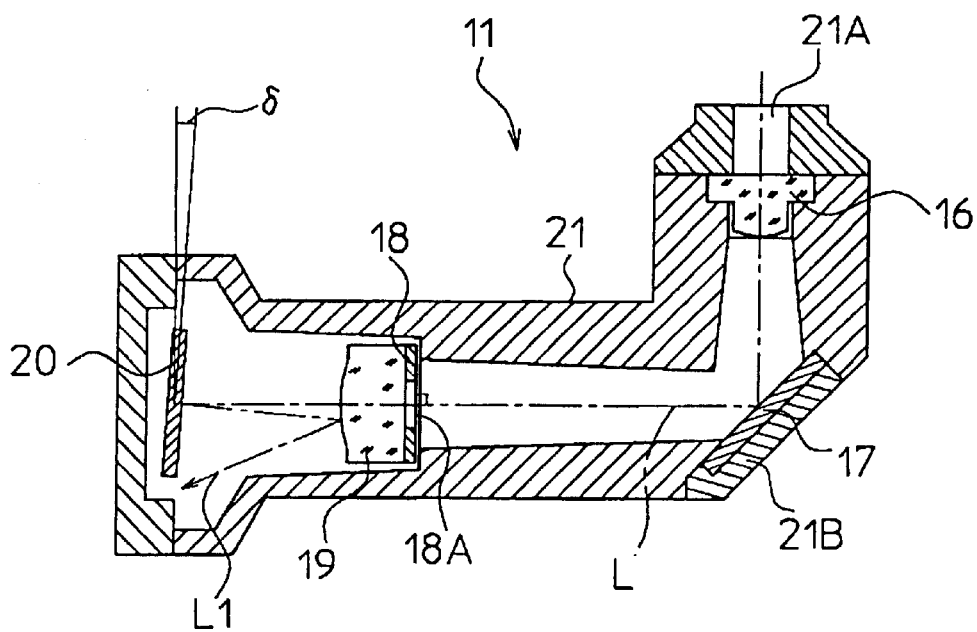
FIG. 6 is a vertical cross-sectional view showing the construction of a second embodiment of the focus detecting device.
Figure 7:
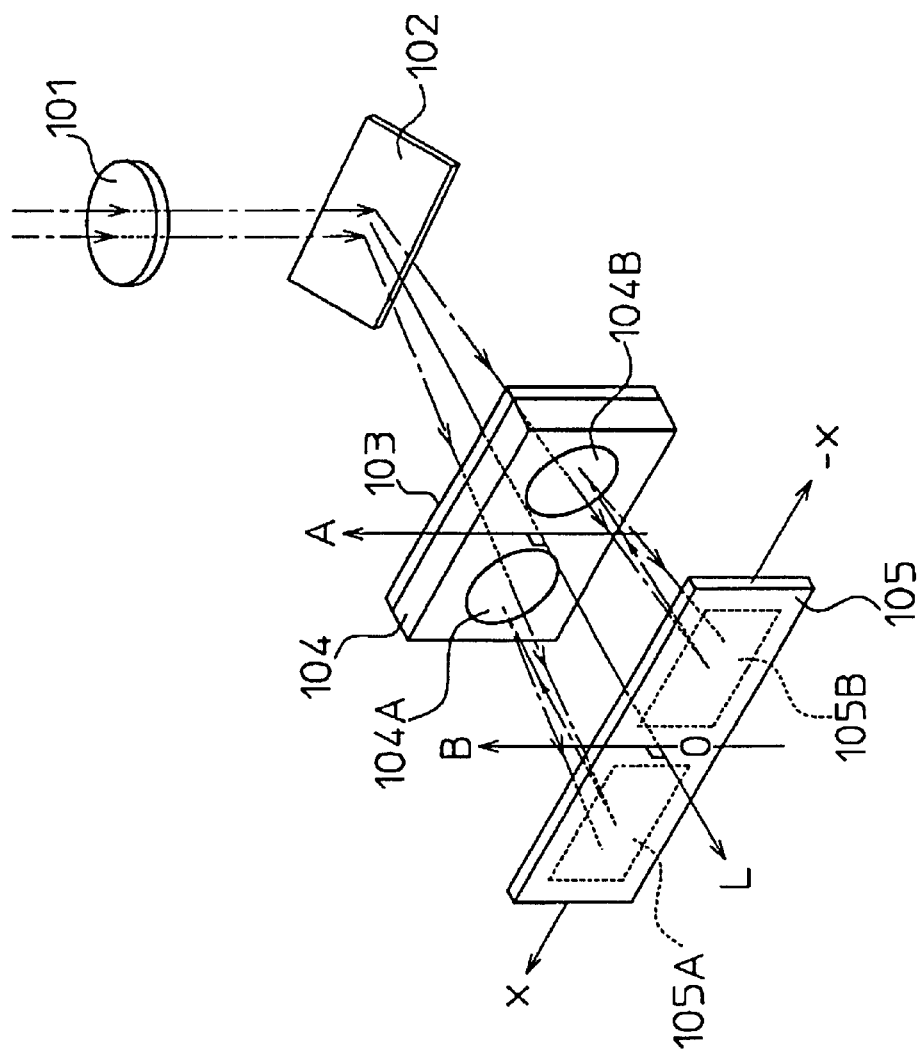
FIG. 7 is a perspective view showing the basic construction of a conventional AF sensor module.
Figure 8:
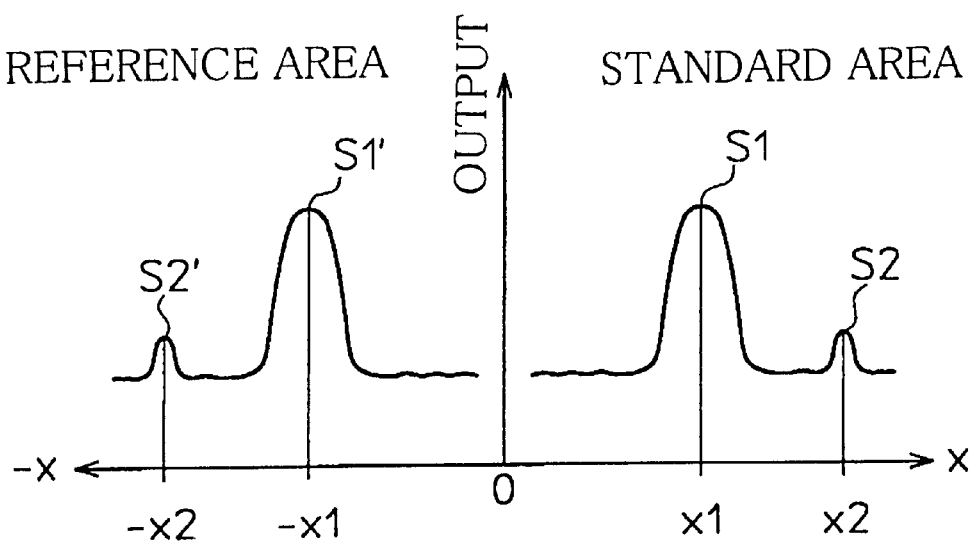
FIG. 8 is a waveform chart showing one example of image signals output from the standard area and the reference area of the CCD line sensor of the conventional AF sensor module.

FIG. 6 is a vertical cross-sectional view showing the construction of a second embodiment of AF sensor module 11.

AF sensor module 11 shown in this drawing is different from that shown in FIG. 2, in that the lens surface of separator lens 19 is perpendicular to optical axis L and CCD 20 is inclined by prescribed micro-angle δ with its lengthwise center line N as the rotational axis such that its upper edge approaches separator lens 19. In other words, CCD 20 is located such that its image pickup surface is inclined relative to optical axis L within the vertical plane. It is also acceptable if the angling is such that the lower edge of CCD 20 approaches separator lens 19.

The second embodiment shares the characteristic of the first embodiment that the lens surface of separator lens 19 and the image pickup surface of CCD 20 are non-parallel to each other within the vertical plane, and therefore it naturally has the same effect as the first embodiment described above.

In the embodiments described above, either the lens surface of separator lens 19 or the image pickup surface of CCD 20 is inclined with regard to optical axis L within the vertical plane in order to make easy the setting of angling angle δ and the non-parallel state. However, it is also acceptable if both surfaces are inclined relative to the optical axis in achieving the non parallel relationship between separator lens 19 and CCD 20.

The construction described above is used to prevent reflected light L1 existing between separator lens 19 and CCD 20 from re-striking the image pickup surface of CCD 20 by making the lens surface of separator lens 19 and the image pickup surface of CCD 20 non-parallel to each other. As long as this object is attained, the non-parallel relationship between the lens surface of separator lens 19 and the image pickup surface of CCD 20 is not limited to the first and second embodiments described above.

In other words, either separator lens 19 or CCD 20 may be inclined relative to optical axis L such that the normal line of the lens surface of separator lens 19 or the normal line of the image pickup surface of CCD 20 becomes inclined with regard to optical axis L. In this case, it is preferred that either separator lens 19 or CCD 20 be inclined relative to optical axis L within a plane other than the plane incorporating optical axis L and center line N of CCD 20 (a plane perpendicular to the paper surface in FIG. 2 or FIG. 6, hereinafter 'the horizontal plane').

This is because when either separator lens 19 or CCD 20 is inclined relative to optical axis L within the horizontal plane, the image formation points on the image pickup surface of CCD 20 move along the line of the photoelectric conversion elements of CCD 20 due to said angling, but when either separator lens 19 or CCD 20 is inclined relative to optical axis L within a plane other than the horizontal plane, the image formation points on the image pickup surface of CCD 20 move in a direction different from the direction of the line of photoelectric conversion elements of CCD 20, i.e., in a direction that is not parallel to said line, and therefore the re-striking of reflected light L1 on CCD 20 may be further reduced.

While explanations were provided in the embodiments described above using a focus detecting device used in a single lens reflex camera as an example of a detecting device, the detecting device of the present invention is not limited to said focus detecting device. For example, the present invention may be applied in a passive type distance measuring device used in lens shutter cameras. The basic principle of a passive type distance device is basically the same as that of a focus detecting device: The object photo image is separated into two photo images, which are then formed on an image pickup device comprising photoelectric conversion elements arranged in a line to detect the distance to the photo object. The lens surface of the optical system to form the photo images on the image pickup device and the image pickup surface of the image pickup device may be arranged to be non-parallel to each other in this construction as well.

Further, the present invention may be applied in other optical devices such as binoculars in which the focus detecting device or the distance measurement device described above may be employed, or in various other measuring devices.

As explained above, the AF sensor module primarily comprises condenser lens 16, mirror 17, aperture mask 18, separator lens 19 and CCD 20. Separator lens 19 is located such that its lengthwise center line M may be parallel to the lengthwise center line N of CCD 20 while it is inclined by micro-angle δ with center line M as the rotational axis. By arranging the lens surface of separator lens 19 and the image pickup surface of CCD 20 such that they are non-parallel to each other, reflected light L1 existing due to the reflection of light between separator lens 19 and CCD 20 is prevented from striking CCD 20 once again so that a reduction in the accuracy of focus detection caused by said reflected light may be prevented.

Obviously, many modifications and variation of the present invention are possible in light of the above teachings. It is therefore to be understood that within the scope of the appended claims, the invention may be practiced other than as specifically described.

What is claimed is:

1. A detecting device, comprising:
   an image pickup device arranged along a first optical axis and having an image pickup surface, the image pickup device including plural photoelectric conversion elements; and
   an image re-forming lens arranged along a second optical axis, the image re-forming lens re-forming an image from an object image formed and converged by a prescribed optical system on said image pickup surface of said image pickup device, wherein
      the image re-forming lens is perpendicular to an optical axis of the prescribed optical system, and
      said first optical axis is inclined with respect to said second optical axis.

2. A detecting device as claimed in claim 1, further comprising:
   a condenser lens establishing a reference optical axis, wherein said image pickup surface is inclined with respect to the reference optical axis.

3. A detecting device as claimed in claim 1, wherein said image pickup surface is arranged so that said image pickup surface is inclined pivotally on a line along a respective lengthwise direction of said image pickup device.

4. A focus detecting device which detects focus condition of a prescribed optical system, comprising:
   an image pickup device arranged along a first optical axis and having an image pickup surface, the image pickup device including plural photoelectric elements; and
   an image re-forming lens arranged along a optical second axis, the image reforming lens re-forming an image from an object image formed and converged by said prescribed optical system on said image pickup surface of said image pickup device, wherein
      the image re-forming lens is perpendicular to an optical axis of the prescribed optical system, and
      said first optical axis is inclined with respect to said second optical axis.

5. A focus detecting device as claimed in claim 4, further comprising:
   a condenser lens establishing a reference optical axis, wherein said image pickup surface is inclined with respect to the reference optical axis.

6. A focus detecting device as claimed in claim 4, wherein said image pickup surface is arranged so that said image pickup surface is inclined pivotally on a line along a respective lengthwise direction of said image pickup device.

7. A camera, comprising:
   a focus detecting device that detects a focus condition of a photo-taking optical system, including:
   an image pickup device arranged along a first optical axis and having an image pickup surface, the image pickup device including plural photoelectric conversion elements; and
   an image re-forming lens arranged along a optical second axis, the image re-forming lens re-forming an image from an object image formed and converged by a prescribed optical system on said image pickup surface of said image pickup device, wherein
      the image re-forming lens is perpendicular to an optical axis of the prescribed optical system, and
      said first optical axis is inclined with respect to said second optical axis.

8. camera as claimed in claim 7, further comprising:
   a condenser lens establishing a reference optical axis, wherein said image pickup surface is inclined with respect to the reference optical axis.

9. A camera as claimed in claim 7, wherein said image pickup surface is arranged so that said image pickup surface is inclined pivotally on a line along a respective lengthwise direction of said image pickup device.

* * * * *

UNITED STATES PATENT AND TRADEMARK OFFICE
CERTIFICATE OF CORRECTION

PATENT NO. : 6,369,854 B2
DATED : April 9, 2002
INVENTOR(S) : Iwao Ishida et al.

It is certified that error appears in the above-identified patent and that said Letters Patent is hereby corrected as shown below:

<u>Title page,</u>
Item [30], please add -- Foreign Application Priority Data
Mar. 28, 1996 (JP) 8-074763 --

Signed and Sealed this

Twenty-ninth Day of October, 2002

*Attest:*

JAMES E. ROGAN
*Attesting Officer*        *Director of the United States Patent and Trademark Office*